(12) United States Patent
Shvodian

(10) Patent No.: US 8,050,179 B2
(45) Date of Patent: Nov. 1, 2011

(54) METHOD AND SYSTEM FOR ACKNOWLEDGING FRAMES IN A COMMUNICATION NETWORK

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 823 days.

(21) Appl. No.: 11/231,886

(22) Filed: Sep. 22, 2005

(65) Prior Publication Data

US 2007/0079208 A1   Apr. 5, 2007

(51) Int. Cl.
H04L 12/24   (2006.01)

(52) U.S. Cl. ........................ 370/236; 714/750

(58) Field of Classification Search .......... 370/394, 370/328, 230, 469, 389, 13, 445; 375/110, 375/1; 358/442; 713/320; 714/799
See application file for complete search history.

(56) References Cited

U.S. PATENT DOCUMENTS

| | | | | |
|---|---|---|---|---|
| 5,128,960 A * | 7/1992 | van Driest et al. | ............. | 375/130 |
| 5,272,728 A * | 12/1993 | Ogawa | ............. | 375/372 |
| 5,513,172 A * | 4/1996 | Shikama et al. | ............. | 370/428 |
| 6,005,675 A * | 12/1999 | Maeda et al. | ............. | 358/442 |
| 6,134,237 A * | 10/2000 | Brailean et al. | ............. | 370/394 |
| 6,301,249 B1 | 10/2001 | Mansfield et al. | | |
| 6,907,044 B1 * | 6/2005 | Yonge et al. | ............. | 370/445 |
| 7,073,079 B1 * | 7/2006 | Karsi et al. | ............. | 713/320 |
| 2003/0031203 A1 * | 2/2003 | Fukui | ............. | 370/469 |
| 2003/0206535 A1 * | 11/2003 | Shpak | ............. | 370/328 |
| 2004/0170157 A1 | 9/2004 | Kim et al. | | |
| 2005/0135295 A1 * | 6/2005 | Walton et al. | ............. | 370/328 |
| 2005/0204247 A1 | 9/2005 | Guo et al. | | |
| 2005/0204250 A1 | 9/2005 | Hong et al. | | |
| 2005/0226241 A1 * | 10/2005 | Yang et al. | ............. | 370/389 |
| 2006/0045010 A1 * | 3/2006 | Baker et al. | ............. | 370/230 |
| 2006/0083233 A1 * | 4/2006 | Nishibayashi et al. | ....... | 370/389 |
| 2007/0140115 A1 * | 6/2007 | Bienas et al. | ............. | 370/230 |
| 2009/0199076 A1 * | 8/2009 | Boer et al. | ............. | 714/799 |

FOREIGN PATENT DOCUMENTS

| WO | 2004008703 A1 | 1/2004 |
|---|---|---|
| WO | 2004049652 A1 | 6/2004 |

OTHER PUBLICATIONS

International Search Report and Written Opinion.

* cited by examiner

*Primary Examiner* — Kwang B Yao
*Assistant Examiner* — Syed M Bokhari

(57) ABSTRACT

A communication device (1001) is provided. The communication device (1001) can include a transceiver (1003), for transmitting and receiving communications when operably connected to a communication network. Also, the communication device (1001) can include a processor (1009) cooperatively operable with the transceiver (1003). The processor (1009) can facilitate receiving (1015) one or more frames from a transmitting device. Also, the processor (1009) can obtain a frame check sequence result (1019). Before obtaining the frame check sequence result, the processor can initiate (1017) a transmission of a responsive frame corresponding to the one or more frames. The responsive frame will explicitly indicate an acknowledgement (ACK) or negative acknowledgement (NAK) of the one or more frames.

17 Claims, 5 Drawing Sheets

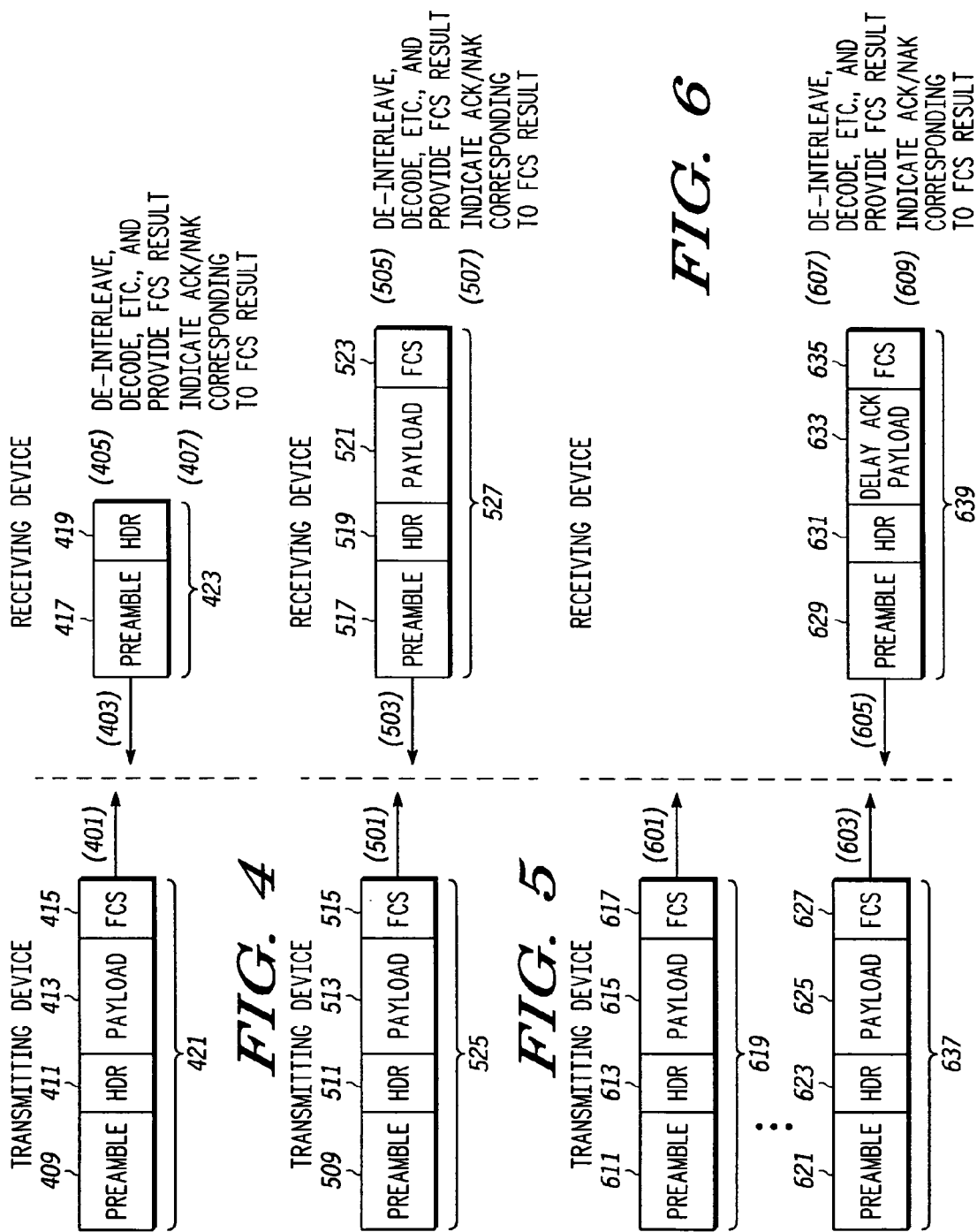

METHOD AND SYSTEM FOR ACKNOWLEDGING FRAMES IN A COMMUNICATION NETWORK

FIELD OF THE INVENTION

The present invention relates in general to communication networks, and more specifically to providing acknowledgements of frames in a communication network.

BACKGROUND OF THE INVENTION

In a communication system, a transmitting device sends a frame of data to a receiving device. When receiving a frame, there can be significant delay between the time that the last bit of a frame is received over the air and the time that it is determined whether there was an error in the frame which can result in inefficient use of the channel.

There are a number of reasons for this latency. Several procedures can be performed by hardware, software, or a combination, to prepare received information for further processing and check for errors in the frame. These procedures typically include, for example, de-interleaving, de-whitening, and forward error correction such as Viterbi decoding. Depending on the protocol, other checks such as a CRC (cyclic redundancy check) or similar can be performed in addition to the de-interleaving, whitening, and decoding, to further determine whether there was an error. These procedures are sometimes collectively referred to as a "frame check sequence" (FCS).

Each of these procedures takes a certain amount of time before it can determine whether a frame has an error. While the de-whitening does not introduce significant time, the Viterbi decoder can be responsible for much of the delay. There can be a significant time from when the last bit of the frame is received over the air until it is decided whether the frame was received without error.

Certain protocols such as IEEE 802.15.3 provide for the receiving device to transmit a positive acknowledgement to the transmitting device when there is an error in the frame. However, according to the 802.15.3 protocol, if there is an error, the transmitting device does not expect to receive any particular response. Nevertheless, the transmitting device can await the possible receipt of a positive acknowledgement.

An ultra wide band (UWB) physical layer can turn around very quickly from to transmit. Nevertheless, the receive check processing described above adds latency and introduces unproductive dead air time.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 4 is a diagram illustrating a protocol for a receiving device to indicate acknowledgement or negative acknowledgement of a transmission from a transmitting device, in accordance with one or more embodiments;

FIG. 5 is a diagram illustrating a protocol for a receiving device to indicate acknowledgement or negative acknowledgement of a transmission from a transmitting device, in accordance with one or more first alternative embodiments;

FIG. 6 is a diagram illustrating a protocol for a receiving device to indicate acknowledgement or negative acknowledgement of a transmission from a transmitting device, in accordance with one or more second alternative embodiments;

DETAILED DESCRIPTION

In overview, the present disclosure concerns wireless communications devices or units, often referred to as communication units, such as cellular phone or two-way radios and the like having capability to transmit and receive data, such as associated with a communication system such as an ad hoc wireless personal area network, an Enterprise Network, a cellular Radio Access Network, or the like. Such communication systems may further provide services such as voice, multimedia and data communications services. More particularly, various inventive concepts and principles are embodied in systems, communication units, and methods therein for transmitting a timely acknowledgement of a transmission to a communication unit.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or
} in software and/or integrated circuits (ICs), such as a digital signal processor and software therefore and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and/or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to reduce the latency in receiving a frame and responding to the frame with a negative acknowledgement or an acknowledgement.

Figure 1:
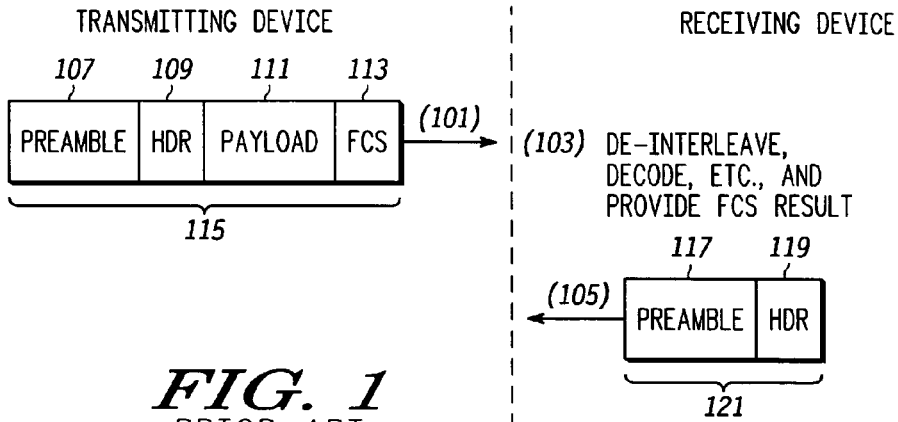
FIG. 1 is a diagram illustrating a receiving device indicating an acknowledgement to a transmitting device, in accordance with a first prior art method.
Figure 2:
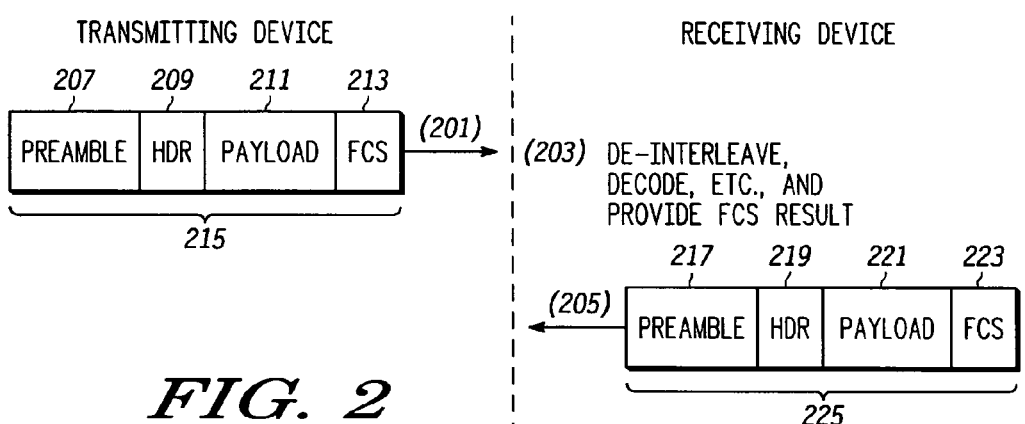
FIG. 2 is a diagram illustrating the receiving device indicating an acknowledgement to the transmitting device, in accordance with a second prior art method.
Figure 3:
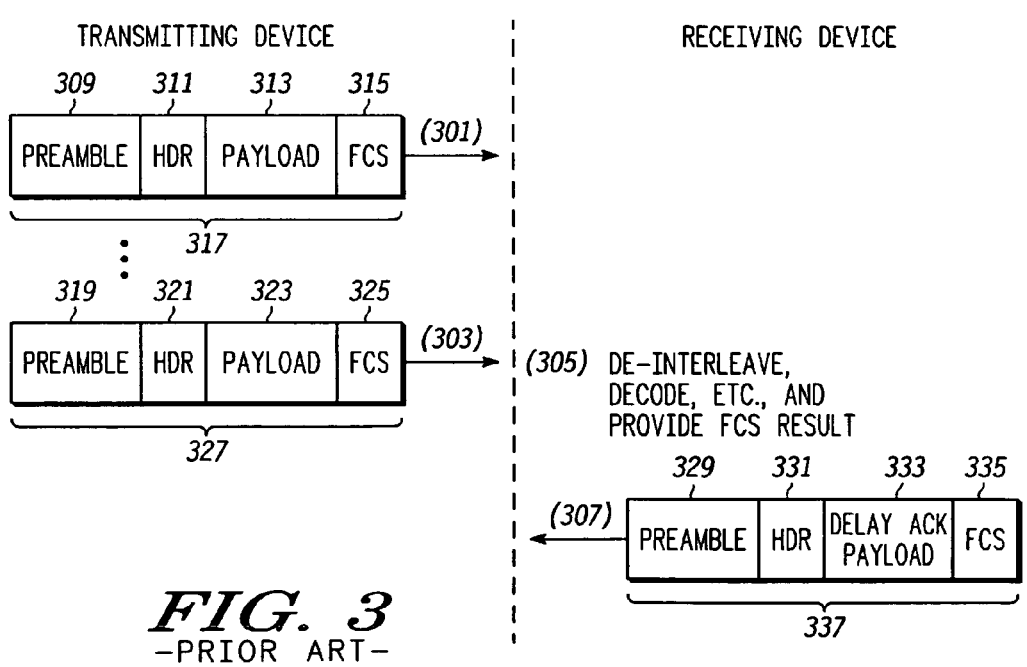
FIG. 3 is a diagram illustrating the receiving device indicating an acknowledgement to the transmitting device, in accordance with a third prior art method.

FIG. 1-FIG. 3 illustrate various conventional policies for sending an acknowledgement or negative acknowledgement to a transmitting device. FIG. 1 illustrates an immediate ACK policy, calling for an immediate acknowledgement (ACK); FIG. 2 illustrates an implied ACK policy, calling for an implied ACK; and FIG. 3 illustrates a delayed ACK policy, providing for a delayed ACK.

In each of these policies, a transmitting device sends one or more frames to a receiving device. After receiving the frame(s), the receiving device performs various functions including error correction and error checking in accordance with known techniques. After performing the error checking, the receiving device begins transmission of the appropriate responsive frame indicating the acknowledgement. The policy can be set in various known ways, for example, indicated by each frame, indicated in a channel time allocation (CTA), or set by a frame until changed, etc. Each of these example policies will be explored in more detail in FIG. 1-FIG. 3 to provide a baseline for discussion of various embodiments. If a frame is not transmitted correctly, typically no ACK frame is sent and the transmitting device must timeout before sending further transmissions, such as attempting re-transmission.

Referring now to FIG. 1, a diagram illustrating a receiving device indicating an acknowledgement to a transmitting device, in accordance with a first prior art method will be discussed and described. Here, the illustrated policy can be "no ACK" or "immediate ACK." If the policy is "immediate ACK," the receiving device is expected to transmit a responsive frame 121 corresponding to an ACK when it successfully received the frame 115 from the transmitting device. Contrariwise, where the policy is "no ACK," no ACK is sent regardless of whether the frame was correctly received.

The frame 115 from the transmitting device is structured in accordance with one of any conventional protocols. In the illustrated example, the protocol is 802.15.3. The illustrated frame 115 includes a preamble 107, header 109, payload 111, and frame check sequence 113, all of which are well understood fields. The responsive frame 121 includes a preamble 117 and a header 119. No payload or FCS is expected in the responsive frame 121.

Conventionally, the transmitting device transmits 101 the frame 115. Then, after receiving the last bit of the frame over the air, the receiving device performs the receive processing 103 and produces the result of the error checking, referred to herein as the frame check sequence (FCS) result. In the illustrated example, the receive processing 103 includes de-interleaving, decoding, etc. The receive processing and error checking 103 conventionally is performed primarily by hardware, but can include a software process. The receiving device performs the receive processing and checks the FCS result before beginning to transmit a responsive frame 121, if any. If the policy is "no ACK," and if the FCS result indicates an error, the receiving device does not transmit a responsive frame. Alternatively, if the policy is "immediate ACK," and if the FCS result indicates no error, the receiving device transmits 105 the responsive frame 121, thereby indicating ACK; if the FCS result indicates an error, the receiving device does not transmit a responsive frame.

There is a period of latency at the receiving device between the receipt of the last bit of the frame 115 on the air and the beginning of transmission 105 of the responsive frame 121, while the receiving device awaits the result of the receive processing and error checking 103. Once the FCS result is available, the receiving device can determine whether to send the responsive frame, and can then begin transmission 105 of the responsive frame 121.

Referring now to FIG. 2, a diagram illustrating the receiving device indicating an acknowledgement to the transmitting device, in accordance with a second prior art method will be discussed and described. Here, the illustrated policy is "implied ACK". The receiving device is expected to transmit 205 a responsive frame 225 when it successfully received a frame 215 from the transmitting device. The ACK is implied from the fact that the receiving device sent a transmission.

The frame 215 from the transmitting device in the illustrated example is structured in accordance with the 802.15.3 protocol, and includes the usual preamble 207, header 209, payload 211, and frame check sequence 213. The responsive frame 225 includes a preamble 217, a header 219, a payload 221, and an FCS 223. The ACK is implied from the fact that the responsive frame 225 was sent in a timely fashion.

Similar to the policy described in FIG. 1, the transmitting device transmits 201 the frame 215. Then, after receiving the last bit of the frame over the air, the receiving device performs the receive processing and error checking 203, including de-interleaving, decoding and the like, and calculates the FCS result. The receiving device then checks the FCS result before beginning to transmit a responsive frame 225. If the FCS result indicates no error, the receiving device transmits the responsive frame 225. As with FIG. 1, the delay for the FCS result before beginning the transmission 205 of the responsive frame can result in a significant latency.

Referring now to FIG. 3, a diagram illustrating the receiving device indicating an acknowledgement to the transmitting device, in accordance with a third prior art method will be discussed and described. Here, the illustrated policy is "delayed ACK". When the ACK request bit is set in a frame header of a transmitted frame 327, for example, the receiving device is expected to transmit a responsive frame 337 indicating whether it successfully received the one or more transmitted frames 317, 327 from the transmitting device. The delayed ACK is typically utilized in a final frame 327 of a series of frames.

A series of frames including one or more frames 317, 327 is transmitted 301, 303 from the transmitting device. The frames 317, 327 from the transmitting device in the illustrated example are also structured in accordance with the 802.15.3 protocol, and include the usual preamble 309, 319, header 311, 321, payload 313, 323, and frame check sequence 315, 325. The responsive frame 337 is transmitted 307 when a received frame indicates that an ACK is requested (or other indicates that it is the last frame in a series). The responsive frame 337 includes a preamble 329, a header 331, a payload 333 such as that structured for "delay ACK" policy, and an FCS 335. The responsive frame 337 expressly indicates an acknowledgement for each frame in the series. The 803.15.3 protocol provides for an explicit indication of an ACK of each correctly received frame in the series in the delay ACK payload 333, which typically is limited to the ACK information.

As with the policies described in connection with FIG. 1 and FIG. 2, the receiving device begins the transmission 307 of the responsive frame 337 only after performing the receive processing and error checking 305. As with the other conventional methods illustrated in FIG. 1 and FIG. 2, the wait for the FCS result before beginning the transmission 307 of the responsive frame can result in a significant latency.

Further in accordance with exemplary embodiments, the latency between receipt of the frame and transmission of the responsive frame is reduced by beginning transmission of the responsive frame prior to obtaining the FCS result, obtaining the FCS result after beginning the transmission of the responsive frame, and then indicating an ACK or NAK corresponding to the FCS result in the responsive frame before the responsive frame is fully transmitted. FIG. 4-FIG. 6 illustrate various embodiments for sending an acknowledgement or negative acknowledgement to a transmitting device. FIG. 4, FIG. 5 and FIG. 6 illustrates an immediate ACK policy, an implied ACK policy, and a delayed ACK policy, respectively, all in accordance with one or more embodiments.

In overview, in the illustrated embodiments, a transmitting device sends one or more frames to a receiving device. After receiving the frame(s), the receiving device initiates the performance of various error checking. Before receiving the result of the error checking, the receiving device begins transmission over the air of an appropriate responsive frame. Accordingly, the latency between receipt of the frame and transmission of the responsive frame is reduced. Before a field in the frame that is to indicate ACK or NAK is transmitted, the responsive frame will be set to indicate and ACK or NAK corresponding to the FCS result.

Referring now to FIG. 4, a diagram illustrating a protocol for a receiving device to indicate acknowledgement or negative acknowledgement of a transmission from a transmitting device, in accordance with one or more embodiments will be discussed and described. The illustrated policy can be "no ACK" or "immediate ACK."

In the illustrated embodiment, the frame 421 from the transmitting device is structured in accordance with the 802.15.3 protocol, and includes a preamble 409, header 411, payload 413, and frame check sequence 415. The responsive frame 423 can include a preamble 417 and a header 419. The payload and/or FCS can be omitted from the responsive frame 423. The responsive frame 423 can also be structured in accordance with the applicable protocol.

An indication for ACK or NAK can be included in the responsive frame 423. For example, a field or bit can be defined in the header to indicate ACK or NAK; or a payload can be included to indicate ACK or NAK.

The transmitting device transmits 401 the frame 421, which is received at the receiving device. Then, after receiving the last bit of the frame 421 over the air, the receiving device begins to transmit 403 the responsive frame 423. Note that at this time, the error checking 405 has not been completed, and accordingly, it is not known whether the responsive frame 423 will indicate ACK or NAK. Nevertheless, transmission 403 of the responsive frame 423 physically can begin as soon as the communication channel is turned around from receive to transmit. The transmission 403 does not wait until after the error checking is completed, in contrast to the conventional method illustrated for example in FIG. 1.

Also after receiving the last bit of the frame 421, the receiving device can begin to perform the receive processing and error checking 405. The receive processing and error checking 405 can be performed in accordance with known techniques, and can be performed in hardware and/or software in parallel with the transmission 403 of the responsive frame 423. The receive processing and error checking 405 can be automatically initiated at the hardware level.

Once the FCS result is ready from the error checking 405, the receiving device can then indicate ACK or NAK in the responsive frame, corresponding to the FCS result. The receiving device can continue transmission 403 of the responsive frame preamble while the FCS result is checked and it is determined whether ACK or NAK should be indicated.

There is a period of latency at the receiving device between the receipt of the last bit of the frame 421 on the air and the beginning of transmission 403 of the responsive frame 423, while the receiving device turns the channel around from receive to transmit. Note that the transmission of the responsive frame began before the result of the error checking 405 was available, and therefore the latency is reduced in comparison to the example illustrated in FIG. 1.

An elegant way to implement this is to include an indication of ACK or NAK in a pre-defined field in the header 419. The transmitting device can then check the pre-defined field in the header for ACK or NAK to determine whether the transmission was successful, which can further be handled in accordance with conventional techniques. One or more alternative embodiments provides for not completing the transmission of the responsive frame depending on the policy: if the policy is "immediate ACK," abort the transmission if the FCS result indicates an error.

Referring now to FIG. 5, a diagram illustrating a protocol for a receiving device to indicate acknowledgement or negative acknowledgement of a transmission from a transmitting device, in accordance with one or more first alternative embodiments will be discussed and described.

The receiving device is expected to transmit 503 a responsive frame 527 including a payload 521 when it received a frame 525 from the transmitting device. The frame 525 from the transmitting device in the illustrated example includes a preamble 509, a header 511, a payload 513, and frame check sequence 515, in accordance with the 802.15.3 protocol. The responsive frame 527 can include a preamble 517, a header 519, a payload 521, and an FCS 523, also in accordance with the 802.15.3 protocol. Other formats can be utilized in accordance with other protocols.

The transmitting device transmits 501 the frame 525, which is received at the receiving device. Then, after receiving the last bit of the frame 525 over the air, the receiving device begins to transmit 503 the responsive frame 527. The error checking 505 has not been completed, and accordingly, it is not known whether the responsive frame 525 will indicate ACK or NAK. Nevertheless, transmission 503 of the responsive frame 527 physically can begin as soon as the communication channel is turned around from receive to transmit. The transmission 503 does not wait until after the error checking is completed, in contrast to the conventional method illustrated for example in FIG. 2.

Also after receiving the last bit of the frame 525, the receiving device can continue to perform the receive processing and error checking 505, in accordance with known techniques, in hardware and/or software for example in parallel with the transmission 503 of the preamble of the responsive frame 527.

Once the FCS result is ready from the error checking 505, the receiving device can then indicate ACK or NAK in the responsive frame 527, corresponding to the FCS result. The receiving device can continue transmission 503 of the responsive frame 527 while the FCS result is checked and it is determined whether ACK or NAK should be indicated.

As described in connection with FIG. 4, there can be a period of latency between the reception of the last bit of the frame 525 on the air and the beginning of transmission 505 of the responsive frame 527 to accommodate turning the channel around from receive to transmit. However, because the transmission 501 of the responsive frame 527 began before the result of the error checking 505 is available, the latency is reduced in comparison to the example illustrated in FIG. 2.

The illustrated embodiment is based on the "implied ACK" policy, where the responsive frame 527 includes a payload of data. To avoid an implied ACK, the responsive frame 527 can include an indication of NAK and/or ACK. For example, the indicator can be included as a pre-determined bit in the header 519, or in the payload 521. The 802.15.3b protocol provides for a pre-defined field in the header 519 to indicate ACK or NAK. As another example, an ACK can be implied unless NAK is specifically indicated, or the payload 521 can indicate NAK and error processing at the transmitting device can handle the NAK. The transmitting device can then check for the ACK or NAK indication to determine whether the transmission was successful, which can further be handled in accordance with conventional techniques. One or more alternative embodiments provide for not completing the transmission of the responsive frame if the FCS result indicates an error.

Referring now to FIG. 6, a diagram illustrating a protocol for a receiving device to indicate acknowledgement or negative acknowledgement of a transmission from a transmitting device, in accordance with one or more second alternative embodiments will be discussed and described. The illustrated embodiment is consistent with the "delayed ACK" policy as it is handled by the transmitting device. The receiving device transmits a responsive frame 639 indicating whether it successfully received one or more transmitted frames 69, 637 in a series of frames from the transmitting device. The delayed ACK is typically utilized in a final frame 637 of a series of frames. The final frame or the desire for an "ACK" can be indicated in an appropriate frame, such as by the "request ACK" bit provided in the 802.15.3 protocol.

A series of frames including one or more frames 619, 637 is transmitted 601, 603 from the transmitting device. The frames 619, 637 from the transmitting device in the illustrated example can be structured in accordance with a communication protocol. In the illustrated embodiments, the frames are structured in accordance with the 802.15.3 protocol, and include the usual preamble 611, 621, header 613, 623, payload 615, 625, and frame check sequence 617, 627.

The responsive frame 639 can be transmitted 605 when a received frame indicates that an ACK is requested (or otherwise indicates that it is the last frame in a series). In this embodiment, the responsive frame 639 is structured in accordance with the 802.15.3 protocol and includes a preamble 629, a header 631, a payload 633 such as that structured for "delay ACK" policy, and an FCS 635. The responsive frame 637 can expressly indicate an ACK or NAK, which can be for the series, or for each frame in the series, for example as provided in a protocol, such as the 803.15.3 protocol or similar. Other formats can be utilized in accordance with other protocols.

The transmitting device transmits 601, 603 the frames 619, 637 in the series, which are received at the receiving device. Then, after receiving the last bit of the final frame 637 in the series over the air, the receiving device begins to transmit 605 the responsive frame 639. Although the error checking 607 has not been completed, and accordingly, it is not known whether the responsive frame 639 will indicate ACK or NAK for the most recent frame, transmission 605 of the responsive frame 639 physically can begin as soon as the communication channel is turned around from receive to transmit. The transmission 605 does not wait until after the error checking is completed, in contrast to the conventional method illustrated for example in FIG. 3.

Also after receiving the last bit of the last frame 637 in the series, the receiving device can continue to perform the error checking 607, in accordance with known techniques, in hardware and/or software for example in parallel with the transmission 605 of the responsive frame 639.

Once the FCS result is ready from the error checking 607, the receiving device can then indicate the appropriate ACKs and/or NAKs in the responsive frame 639, corresponding to the FCS result. The receiving device can continue transmission 605 of the responsive frame 639 while the FCS result is checked and it is determined whether ACK (or NAK if applicable) should be indicated. Techniques are known for building the delay ACK payload, including for example, in response to an automatic error check on each frame as it is received.

As described in connection with FIG. 4 and FIG. 5, the period of latency between the reception of the last bit of the most recent frame 603 on the air and the beginning of transmission 605 of the responsive frame 639 is reduced in comparison to the example illustrated in FIG. 3.

Accordingly, one or more embodiments provides for receiving at least one frame from a transmitting device; obtaining a frame check sequence result; and before obtaining the frame check sequence result, initiating a transmission of a responsive frame corresponding to the at least one frame, wherein the responsive frame will indicate an acknowledgement (ACK) or a negative acknowledgement (NAK) of the at least one frame. In accordance with one or more embodiments, the acknowledgement can be indicated explicitly.

Figure 7:
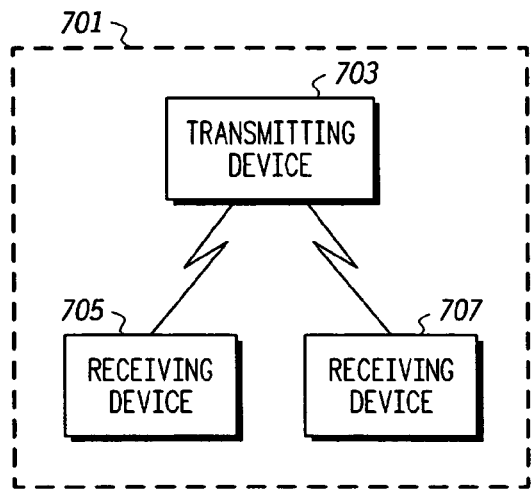
FIG. 7 is a diagram illustrating a simplified and representative environment associated with a communication device and exemplary network arranged for exchanging an acknowledgement of a transmission, in accordance with various exemplary embodiments.

Referring now to FIG. 7, a diagram illustrating a simplified and representative environment associated with a communication device and exemplary network arranged for exchanging an acknowledgement of a transmission, in accordance with various exemplary embodiments will be discussed and described. A communication network 701 encompasses transmitting devices, here represented by transmitting device 703, and receiving devices, here represented by receiving devices 705, 707.

Transmission of communications between the transmitting device 703 and receiving devices 705, 707 are handled in accordance with known techniques. One or more embodiments provide that the communication network is a high speed network. For example, the communication network may be an ultra wide band (UWB) communication network.

In a typical UWB communication network utilizing wireless communication, a transmitting device can send a transmission over the air, and receiving devices 705, 707 which have a channel ready for receive can receive the transmission. A particular receiving device 705, 707 can determine whether the transmission is intended for it in any of several methods, such as by examining a relevant potion of the preamble. A receiving device 705, 707 can send a transmission by turning RF around so the transceiver is ready for transmitting. As soon the transceiver is prepared, the receiving device 705, 707 is physically prepared to transmit a transmission.

Figure 8:
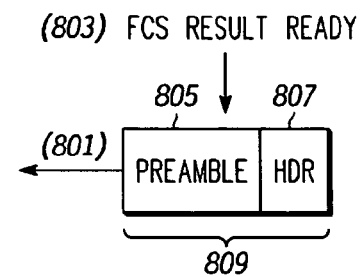
FIG. 8 is a diagram illustrating a timing of indicating an acknowledgement in a responsive frame in accordance with one or more embodiments.
Figure 9:
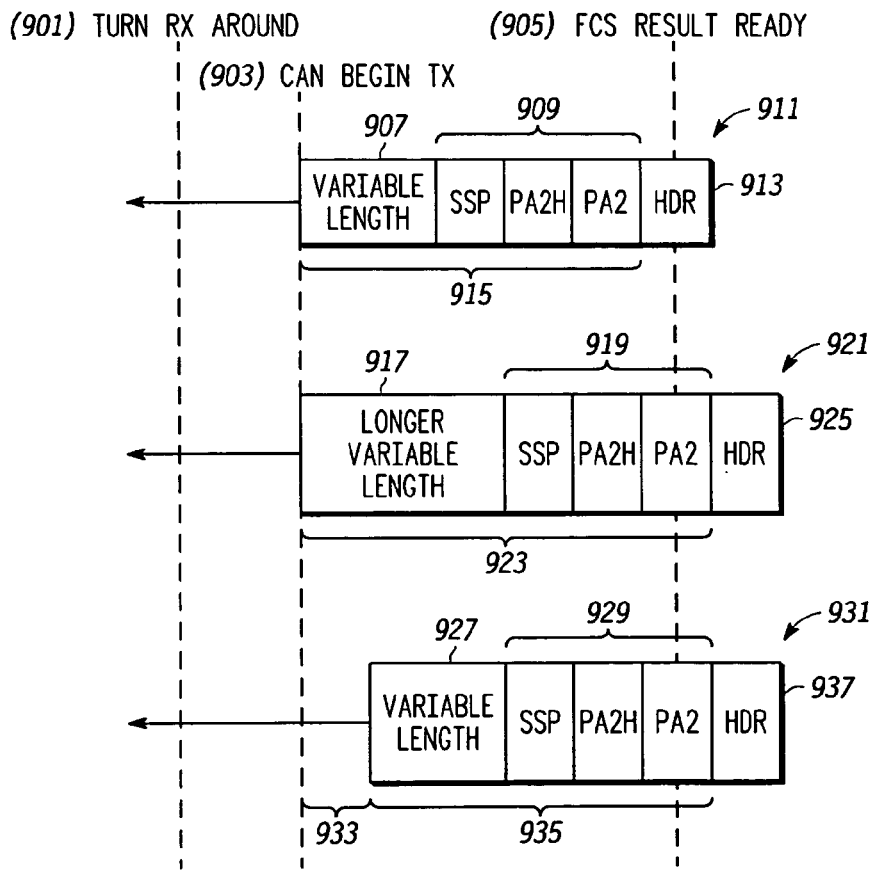
FIG. 9 is a diagram illustrating a timing of indicating an acknowledgement in a responsive frame, in accordance with alternative exemplary embodiments.

In order for the transmission to be accurate, however, the content of the transmission can be provided as required by the hardware before the particular bit (or bits) is physically sent. One or more embodiments envision that the error checking will be complete and the FCS result will be ready so that the ACK or NAK can be timely indicated in the already-begun transmission. Alternative embodiments can provide for handling error checking which will not be complete or where the FCS result will not be ready in time for the ACK or NAK to be indicated in the outgoing transmission in a timely fashion. FIGS. 8 and 9 provide illustrations of exemplary embodiments concerning the timing of indicating ACK or NAK in the outgoing transmission. In FIG. 8, the ACK or NAK is ready in a timely fashion so that no adjustment in timing is needed. In FIG. 9, in contrast, the ACK or NAK is not ready in a timely fashion for an immediate outgoing transmission.

Referring now to FIG. 8, a diagram illustrating a timing of indicating an acknowledgement in a responsive frame in accordance with one or more embodiments will be discussed and described. In the illustrated embodiment, a transmission 801 of the responsive frame 809 is begun as promptly as receive is turned around, beginning with a preamble 805, and the error checking has also been initiated. Assume for the examples in FIGS. 8 and 9 that the ACK or NAK is to be indicated in a header 807 of the responsive frame 809.

In the illustration, the FCS result is ready 803 before the preamble 805 has been completely transmitted. The timing is such that the ACK or NAK corresponding to the FCS result can be set into an appropriate section of the header 807, as defined by a relevant protocol, before the relevant portion of the header is transmitted.

Referring now to FIG. 9, a diagram illustrating a timing of indicating an acknowledgement in a responsive frame, in accordance with alternative exemplary embodiments will be discussed and described. When a final bit of the frame from the transmitting device is received, the receiving device can turn 901 receive around to transmit. Shortly thereafter, the receiving device can begin 903 to transmit data. Transmission of the illustrated first responsive frame 911 is begun immediately after transmit can begin.

As illustrated in the first responsive frame 911, the frame includes a preamble 915 and a header 913. The preamble can include a variable length portion 907, as well as various other fixed length fields 909, such as the SSP, PA2H, and PA2, which are typically fixed in length. Although the preamble is formatted in accordance with, for example, 802.15.3, other protocols also can provide for fixed length and variable length portions.

Here, the ACK or NAK is not ready in a timely fashion for an immediate transmission of the first responsive frame 911. In the illustrated first responsive frame 911, the FCS result is ready 905 after transmission of the header 913 has begun and when it is too late to indicate a corresponding ACK or NAK in the transmission. Because the FCS result is ready too late, the first responsive frame 911 does not accurately indicate ACK or NAK.

One or more alternative embodiments therefore can provide for a delay in initiating transmission of the portion of the responsive frame that is to indicate ACK or NAK. In the second responsive frame 921, the delay can be provided by including a longer variable length portion 917. In the third responsive frame 931, the initiation of transmission of the responsive frame can be delayed. Examples of each of these embodiments are discussed in more detail below.

The illustrated second responsive frame 921 includes a preamble 923 and a header 925, where the preamble 923 is lengthened. The preamble can include a fixed length portion 919 and a variable length portion 917. The variable length portion 917 can be longer than is required. Because the variable length portion 917 is longer, transmission of the portion of the header 925 indicating the ACK or NAK can be delayed.

The amount of length to add to the variable length portion 917 can be determined in various ways. For example, the time for transmitting each bit and a size of a non-padded preamble 923 can be known, and the time for executing the error checking and indicating the ACK or NAK can be calculated. The variable length portion 917 can be padded in ways consistent with the protocol being used in order to provide sufficient time for the ACK or NAK to be indicated in the header. Accordingly, one or more alternative embodiments provide for determining a length of the preamble so that the frame check sequence result will be available before a header of the responsive frame is to be sent, and adjusting a length of the preamble.

Transmission of the illustrated third responsive frame 931 has been delayed, to allow the ACK or NAK sufficient time to be indicated. The third responsive frame 931 includes a preamble 935 and a header 937. The preamble 935 can include a fixed length portion 929 and a variable length portion 927. The variable length portion 917 is a normal length. However, transmission of the third responsive frame 931 has been delayed for a delay time 933. Because transmission of the third responsive frame 931 is delayed, transmission of the portion of the header 925 indicating the ACK or NAK consequently is delayed. Accordingly, one or more other alternative embodiments provide for determining a time of the preamble so that the frame check sequence result will be available before a header of the responsive frame is to be sent, and wherein the initiating is further performed responsive to the time.

The amount of delay time 933 can be determined in various ways, similar to those described above in connection with determining the padding of the variable length portion. For example, the time for transmitting each bit and the size of the preamble 935 can be known, and the time for executing the error checking and indicating the ACK or NAK can be calculated. The delay time can be determined so that the time for transmitting the preamble 935 plus the delay time 933 ensures sufficient time for the ACK or NAK to be indicated in the header 937.

Figure 10:
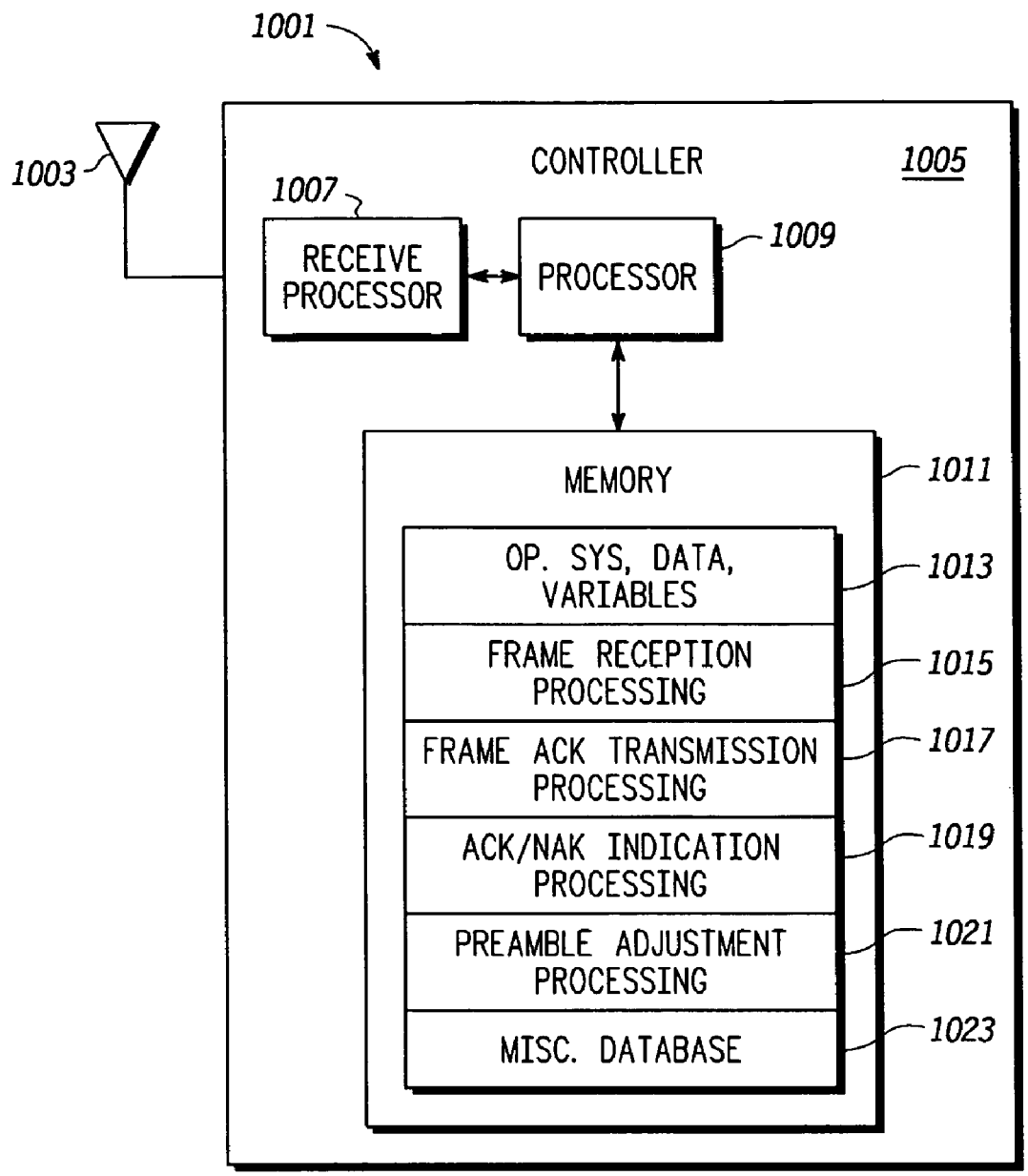
FIG. 10 is a block diagram illustrating portions of an exemplary communication device for exchanging an acknowledgement of a transmission, in accordance with various exemplary embodiments.

Referring now to FIG. 10, a block diagram illustrating portions of an exemplary communication device for exchanging an acknowledgement of a transmission, in accordance with various exemplary embodiments will be discussed and described. The communication device 1001 may include a controller 1005, and a transceiver 1003. The controller 1005 as depicted generally includes a processor 1009, a memory 1011, a receive processor 1007 coupled to the processor 1009 and the transceiver 1003, and may include other functionality not illustrated for the sake of simplicity. The communication device can further include, if desired, additional functions which are not illustrated, for example, a speaker, a text and/or image display, and/or a user input device such as buttons or a keypad.

The processor 1009 may comprise one or more microprocessors and/or one or more digital signal processors. The memory 1011 may be coupled to the processor 1009 and may comprise a read-only memory (ROM), a random-access memory (RAM), a programmable ROM (PROM), and/or an electrically erasable read-only memory (EEPROM). The memory 1011 may include multiple memory locations for storing, inter alia, an operating system, data and variables 1013 for programs executed by the processor 1009; computer programs for causing the processor to operate in connection with various functions such as frame reception processing 1015, frame ACK transmission processing 1017, ACK/NAK indication processing 1019, optional preamble adjustment processing 1021, and/or other processing (not illustrated);

and a database 1023 for other miscellaneous information used by the processor 1009. The computer programs may be stored, for example, in ROM or PROM and may direct the processor 1009 in controlling the operation of the controller 1005. The computer programs can be provided in any computer-readable electronic format, including, for example, over a communication line as electronic signals, on magnetic media, on optical media, and the like. Accordingly, one or more embodiments provide a computer-readable medium comprising instructions executable by a processor.

The processor 1009 may be programmed for frame reception processing 1015. A frame can be received via the transceiver 1003 in accordance with known techniques. For example, the processor 1003 can issue a read frame request. The processor 1009 can be aware that a frame was received in various ways, for example, the processor can wait for reception of the frame, or an interrupt can indicate that the frame is received, or the like.

Further, the processor 1009 may be programmed for frame ACK transmission processing 1017. Once the frame is received, the processor 1009 can initiate transmission of the responsive frame. For example, the processor 1009 can prepare a preamble and portions of a header (except for the ACK or NAK) and then issue a transmit frame request, or can set an appropriate register, or the like. Accordingly, one or more embodiments provide that the transmission that is initiated is of a preamble of the responsive frame. If desired, in accordance with one or more embodiments, transmission of the responsive frame can be delayed by the optional preamble adjustment processing 1021. For example, one or more embodiments provide that transmission of the ACK or NAK, which can be included in the header portion or payload portion of the responsive frame, can be delayed by expanding the size of the variable length portion of the preamble. As another example, one or more embodiments provides for delaying the initiation of transmission of the responsive frame by a delay time.

Moreover, the processor 1009 may be programmed for ACK/NAK indication processing 1019. Accordingly, one or more embodiments provide for setting an ACK/NAK indication, corresponding to the frame check sequence result, in the frame responsive to the frame check sequence result. Also, one or more embodiments provide for setting the ACK/NAK indication in the frame after completion of performing the frame check sequence. Subsequent to initiating transmission of the responsive frame, the processor 1009 can obtain the FCS result, resulting from the error checking. For example, the processor 1009 can issue a read of the register with the FCS result, or can await an interrupt indicating that the FCS result is ready, or the like. In accordance with one or more alternative embodiments, the processor 1009 can perform at least some of the error checking. Error checking performed by the processor 1009 can be initiated either before or after the receive processor 1007 begins to perform its processing. An ACK or NAK indicative of the FCS result can be indicated in the responsive frame. For example, the ACK/NAK indication can be set in the appropriate field or bit(s) of the header and/or the payload.

Accordingly, one or more embodiments provide a communication unit which includes a transceiver, for transmitting and receiving communications when operably connected to a communication network. The communication unit also includes a processor cooperatively operable with the transceiver, and configured to facilitate receiving at least one frame from a transmitting device. The processor also provides for obtaining a frame check sequence result; and before obtaining the frame check sequence result, initiating a transmission of a responsive frame corresponding to the at least one frame, wherein the responsive frame will explicitly indicate an acknowledgement (ACK) or negative acknowledgement (NAK) of the at least one frame.

In accordance with one or more embodiments, the processor 1009 can be programmed for preamble adjustment processing 1021. As discussed in connection with FIG. 9, it may be desirable to delay the header in a responsive frame. Therefore, the processor 1009 can determine the length of time delay before beginning transmission, and/or a longer length of the variable length portion of the preamble of the frame. The time delay or expanded variable length can be determined for each frame, or where the adjustment is predictable, can be pre-determined for example at system start.

It can be advantageous to program the processor 1009 so that one or more of the communications discussed above between the transmitting device and the receiving device are provided in accordance with standard communications protocols, for example, TDMA, such as 802.15.3 or 802.15.3b or other variations and evolutions of TDMA. Further, it can be advantageous to program the processor 1009 for use in an ultra wide band (UWB) communication network.

Responsive to signaling from the transceiver 1003, upon execution of instructions by the processor 1009, or automatically upon receipt of certain information via the transceiver 1003, the receive processor 1007 can begin performing a frame check sequence to determine whether a received frame has an error. The receive processor 1007 can provide the FCS result in an appropriate way for the processor 1009 to obtain the FCS result. For example, the FCS result can be provided in a specific register or location in memory 1011, where it can be obtained by the processor 1009; or the FCS result can be obtained by request to the receive processor 1007; or upon an alert mechanism to the FCS processor 1009; or the like. Accordingly, one or more embodiments includes a component for performing a frame check sequence responsive to the at least one frame, and providing a result of the performing as the frame check sequence result.

The processor 1009 can turn the transceiver 1003 from receive to transmit, and/or from transmit to receive, automatically upon receipt of pre-determined information via the transceiver 1003, or upon execution of instructions by the processor 1009, or responsive to signaling from the transceiver 1003.

Figure 11:
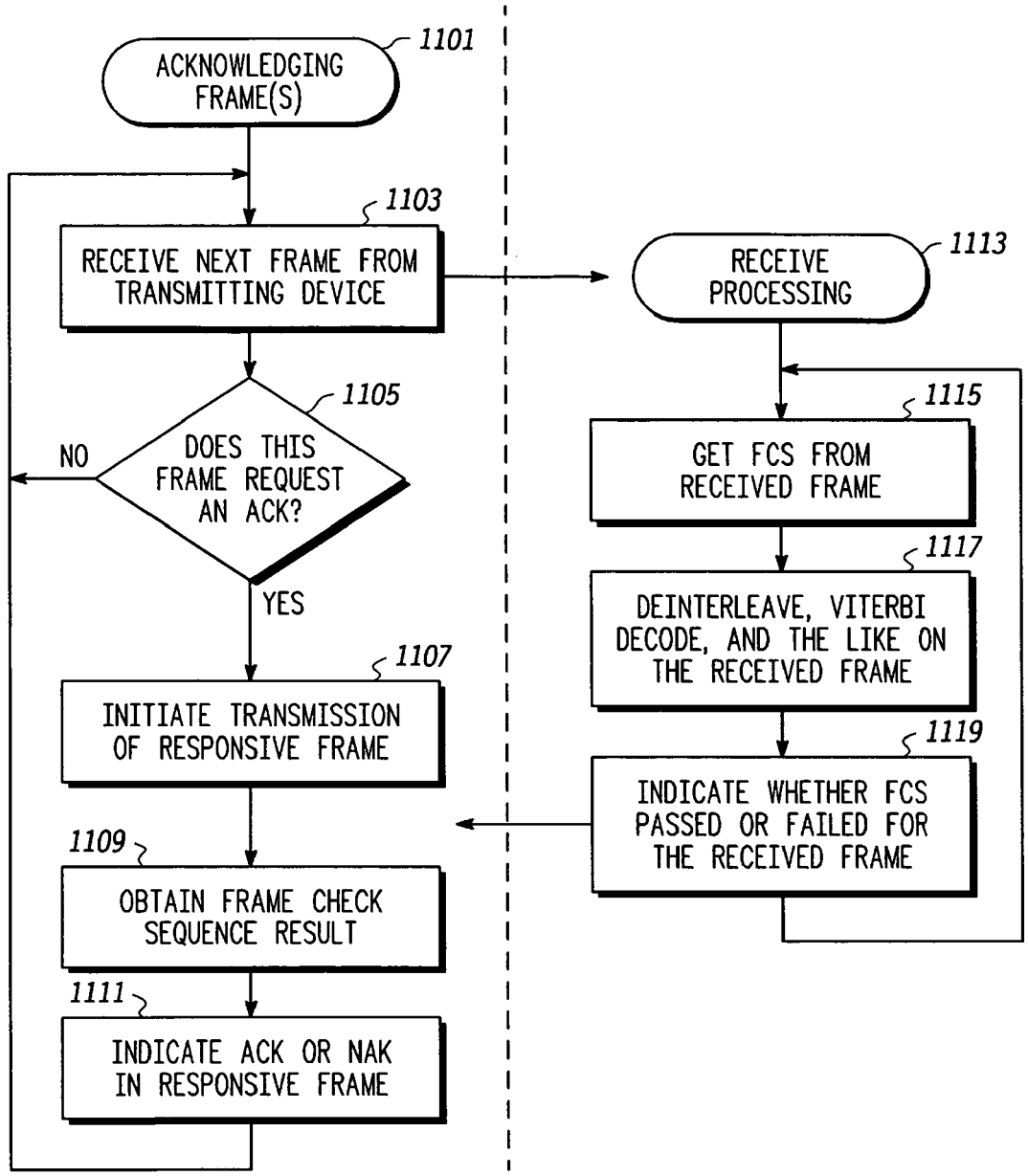
FIG. 11 is a flow chart illustrating an exemplary procedure for acknowledging frames, in accordance with various exemplary and alternative exemplary embodiments.

Referring now to FIG. 11, a flow chart illustrating an exemplary procedure for acknowledging frames in accordance with various exemplary and alternative exemplary embodiments will be discussed and described. The procedure can advantageously be implemented on, for example, a processor of a controller, described in connection with FIG. 10 or other apparatus appropriately arranged.

In overview, the procedure for acknowledging frame(s) 1101 includes receiving 1103 the next frame from the transmitting device; commencing receive processing 1113; determining whether the frame requests an ACK 1105, and if so, initiating transmission of a responsive frame 1107; obtaining 1109 a frame check sequence result; and indicating 1111 ACK or NAK in the responsive frame. Processing then can loop to repeat. Receive processing 1113 can include getting 1115 the FCS from the received frame; performing 1117 de-interleaving, Viterbi decoding, and the like on the received frame; de-whitening the received bits; and indicating 1119 whether the FCS passed or failed for the received frame. In the illustrated procedure, the receive processing 1113 and the remainder of the frame acknowledging processing 1101 can operate in parallel. Each of these portions of the exemplary procedure is discussed in more detail below, although some details which have been previously discussed may be omitted.

The procedure can include receiving 1103 the next frame from the transmitting device. For example, the frame can be received by requesting a read, or by awaiting an interrupt indicating that the appropriate registers are ready for reading, or by similar processing.

The procedure can include commencing frame check sequence (FCS) processing 1113. Where a frame has been received, generally it is desirable to check that there were no errors in the frame. Note that the FCS processing does not delay the initiation 1107 of transmission of the responsive frame. FCS processing is described separately below.

The procedure can determine whether the frame requests an ACK 1105. Accordingly, one or more embodiments includes determining whether a most recently received frame of the at least one frame requests an ACK response, wherein the initiating is performed if the most recently received frame requests an ACK response. Moreover, alternative embodiments can provide that the initiating is performed only if the most recently received frame requests an ACK response. For example, the frame itself can explicitly indicate an ACK request, as is currently done in a delayed ACK from the last frame in a series. If the most recently received frame requests an ACK 1105, then a responsive frame should be sent indicating an ACK or NAK. As another example, the policy can indicate that the frame requests an ACK. For example, the "implied ACK" policy in 802.15.3b calls for an ACK or NAK indication in a responsive frame; the various embodiments of "immediate ACK" and "no ACK" discussed herein requests an ACK or NAK indication in a responsive frame. If it is known that each frame will request an ACK or NAK, this determination can be omitted.

If the frame does not request an ACK, that is, no responsive frame is needed, then the transmission of a responsive frame 1107, 1109, 1111 can be omitted, and processing returns to receiving 1103 the next frame.

Otherwise, a responsive frame is called for. Thus, the procedure includes initiating transmission of a responsive frame 1107, without awaiting the result of the FCS processing. The transmission can be initiated in accordance with known conventional techniques.

Furthermore, the procedure can include obtaining 1109 a frame check sequence (FCS) result. The FCS result can be obtained as explained previously.

The procedure also includes providing an indication of in the responsive frame of ACK or NAK 1111, corresponding to the FCS result to indicate no error or error. For example, a pre-determined bit in the header can be set appropriately, or an ACK payload can be included in the responsive frame. Processing can then repeat.

The frame check sequence (FCS) processing 1113 can be performed in accordance with known techniques. For example, the FCS processing 1113 can include getting 1115 the FCS from the received frame. The FCS in the received frame is utilized by the FCS processing to determine whether the frame has any error. The FCS is a field in the received frame defined in various protocols.

The FCS processing can include performing 1117 de-interleaving, Viterbi decoding, and the like on the received frame, utilizing the FCS from the received frame. This will indicate whether there is an error in the received frame.

FCS processing can also include providing an indication 1119 whether the FCS passed or failed for the received frame. For example, if the de-interleaving, Viterbi decoding, or other processing such as a CRC check, fails, an indication that the FCS failed can be returned in conventional techniques as a parameter or in a register, or the like. This indication can be referenced by further processing to determine whether the responsive frame should indicate an ACK or a NAK.

Any of the above processing can be performed in software and/or implemented in hardware. Accordingly, one or more embodiments include instructions for causing a frame check sequence responsive to the at least one frame, and obtaining a result of the performing as the frame check sequence result. For example, all or part of the receive processing can be performed in a receive processor circuit, or all or portions thereof can be performed by software instructions. In addition, any of the above processing can be performed automatically. For example, the receive processing can be initiated automatically upon receipt of a first bit of a frame or upon receipt of a frame, or other appropriate condition; the receiving 1103 of the next frame from the transmitting device can occur automatically when the transceiver or receiver detects that a frame is being received.

Accordingly, one or more embodiments provide for a computer-readable medium comprising instructions for execution by a computer, the instructions including a computer-implemented method for acknowledging frames in a communications network.

It should be noted that the term communication device may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, or within a private network such as an enterprise network. Examples of such units include personal digital assistants, personal assignment pads, wireless home entertainment components, digital still and video cameras, personal media players, and personal computers equipped for wireless operation, a cellular handset or device, or equivalents thereof.

The communication systems and communication units of particular interest are those wired or wireless networks including wireless local area networks such as, for example, 802.11 or Hiper Lan, wireless personal area networks like 802.15.3 and 802.15.3b, Bluetooth, 802.15.4 and potentially other network where the transmitters and receivers share the channel in a TDMA/TDD fashion, and variants or evolutions thereof.

Furthermore the wireless communication units or devices of interest can include packet or frame based capabilities that may use CDMA (code division multiple access), frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
    a transceiver, for transmitting and receiving communications when operably connected to a communication network; and
    a processor cooperatively operable with the transceiver, and configured to facilitate
        receiving at least one frame from a transmitting device;
        obtaining a frame check sequence result;
        before obtaining the frame check sequence result, beginning actual transmission of a responsive frame to the transmitting device corresponding to the at least one frame over a transmission medium; and
        after obtaining the frame check sequence result, but before completing the actual transmission of the responsive frame to the transmitting device, including information in the responsive frame based on the frame check sequence result that indicates an acknowledgement (ACK) or negative acknowledgement (NAK) of the at least one frame.

2. The communication device of claim 1, further comprising a component for performing a frame check sequence responsive to the at least one frame, and providing a result of the performing as the frame check sequence result.

3. The communication device of claim 1, wherein the transmission that is actually begun is of a preamble of the responsive frame.

4. The communication device of claim 3, wherein the processor is further configured for determining a length of the preamble so that the frame check sequence result will be available before a header of the responsive frame is to be sent, and adjusting a length of the preamble.

5. The communication device of claim 3, wherein the processor is further configured for determining a time of the preamble so that the frame check sequence result will be available before a header of the responsive frame is to be sent, and wherein the beginning of actual transmission is further performed responsive to the time.

6. The communication device of claim 1, further comprising determining whether a most recently received frame of the at least one frame requests an ACK response, wherein the beginning of actual transmission is performed if the most recently received frame requests an ACK response.

7. A non-transitory computer-readable medium comprising instructions for execution by a computer, the instructions including a computer-implemented method for acknowledging frames in a communications network, the instructions for implementing the steps of:
    receiving at least one frame from a transmitting device;
    obtaining a frame check sequence result; and
    before obtaining the frame check sequence result, beginning actual transmission of a responsive frame to the transmitting device corresponding to the at least one frame over a transmission medium;
    after beginning actual transmission of the responsive frame to the transmitting device, but before completing actual transmission of the responsive frame to the transmitting device, inserting information into the responsive frame that indicates an acknowledgement (ACK) or negative acknowledgement (NAK) of the at least one frame based on the frame check sequence result.

8. The non-transitory computer-readable medium of claim 7, further comprising instructions for causing a frame check sequence responsive to the at least one frame, and obtaining a result of the performing as the frame check sequence result.

9. The non-transitory computer-readable medium of claim 7, wherein the transmission that is actual begun is of a preamble of the responsive frame.

10. The non-transitory computer-readable medium of claim 9, further comprising instructions for determining a length of the preamble so that the frame check sequence result will be available before a header of the responsive frame is to be sent, and adjusting a length of the preamble.

11. The non-transitory computer-readable medium of claim 9, further comprising instructions for determining a time of the preamble so that the frame check sequence results will be available before a header of the responsive frame is to be sent, and wherein the beginning of actual transmission is further performed responsive to the time.

12. The non-transitory computer-readable medium of claim 7, further comprising instructions for determining whether a most recently received frame of the at least one frame requests an ACK response, wherein the beginning of actual transmission is performed only if the most recently received frame requests an ACK response.

13. A method for acknowledging frames in a communication network, comprising:
    receiving at least one frame from a transmitting device;
    performing, responsive to the at least one frame, a frame check sequence process on the at least one frame; and
    responsive to the at least one frame and before completion of performing the frame check sequence process, beginning actual transmission of a responsive frame to the transmitting device over a transmission medium,
    adding information to the responsive frame that explicitly indicates an acknowledgement (ACK) or negative acknowledgement (NAK) of the at least one frame based on a frame check sequence result obtained from the frame check sequence process, the adding of information to the responsive frame being executed after the completion of performing the frame check sequence process and before completion of actual transmission of the responsive frame.

14. The method of claim 13, wherein the transmission that is actually begun is of a preamble of the responsive frame.

15. The method of claim 14, further comprising determining a length of the preamble so that the frame check sequence result will be available before a header of the responsive frame is to be sent, and adjusting a length of the preamble.

16. The method of claim 14, further comprising determining a time of the preamble so that the frame check sequence result will be available before a header of the responsive frame is to be sent, and wherein the beginning of actual transmission is further performed responsive to the time.

17. The method of claim 13, further comprising determining whether a most recently received frame of the at least one frame requests an ACK response, wherein the beginning of actual transmission is performed if the most recently received frame requests an ACK response.

* * * * *